United States Patent [19]

Conn et al.

[11] 4,033,719
[45] July 5, 1977

[54] ULTRAVIOLET STERILIZER

[76] Inventors: Arnold Conn, 253 West End Ave., Brooklyn, N.Y. 11207; Harvey K. Cohen, 79 Skyline Drive, Coram, N.Y. 11727

[22] Filed: Dec. 22, 1975

[21] Appl. No.: 643,149

Related U.S. Application Data

[63] Continuation-in-part of Ser. Nos. 397,637, Sept. 17, 1973, Pat. No. 3,965,007, and Ser. No. 586,186, June 12, 1975.

[52] U.S. Cl. .............................. 21/102 R; 21/54 R; 21/DIG. 2; 210/169; 250/435; 250/438
[51] Int. Cl.² ...................... A01K 64/02; A61L 3/00
[58] Field of Search .......... 21/102 R, 54 R, DIG. 2; 210/169

[56] References Cited
UNITED STATES PATENTS

| | | | |
|---|---|---|---|
| 3,174,819 | 3/1965 | Clayton | 21/54 R X |
| 3,433,946 | 3/1969 | Hardwick | 21/102 R X |
| 3,551,091 | 12/1970 | Veloz | 21/102 R |
| 3,661,262 | 5/1972 | Sanders | 210/169 |
| 3,688,907 | 9/1972 | Oravec | 210/169 |
| 3,731,090 | 5/1973 | Veloz | 21/102 R |
| 3,771,544 | 11/1973 | Horvath | 210/169 X |
| 3,785,494 | 1/1974 | Sama | 210/169 |
| 3,791,790 | 2/1974 | Wyndham | 21/DIG. 2 |
| 3,850,806 | 11/1974 | Cohen | 210/169 |

*Primary Examiner*—Sidney Marantz
*Attorney, Agent, or Firm*—Peter L. Berger

[57] ABSTRACT

An ultraviolet sterilizer for a recirculating water flow filter system in which the sterilizer includes a low power source of ultraviolet light. Means are employed to thin out an air-water recirculating sheet and the ultraviolet sterilizer is placed a small distance from the sheet in order to irradiate the mixture and create an ozone layer further sterilizing the recirculating mixture.

6 Claims, 2 Drawing Figures

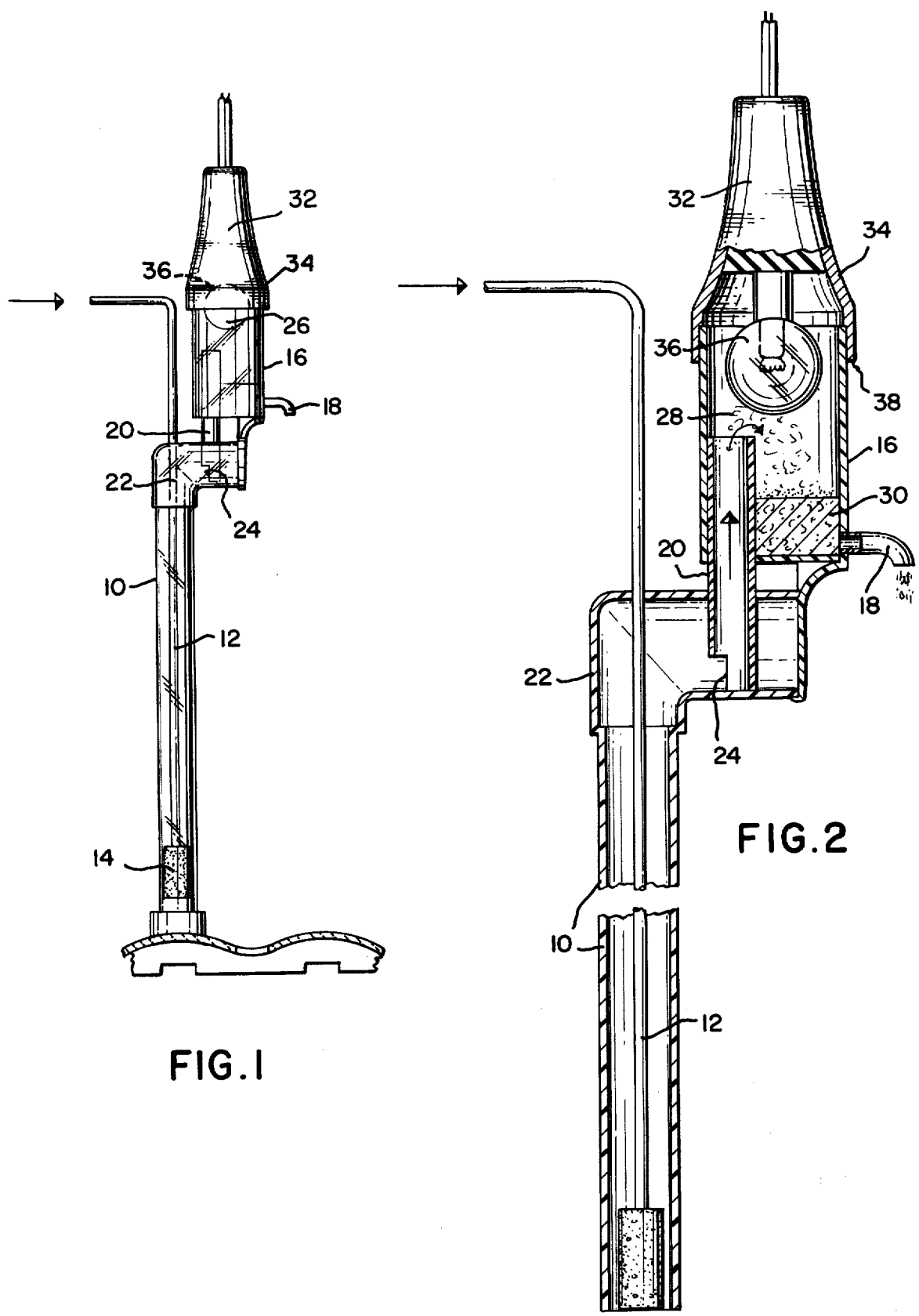

ULTRAVIOLET STERILIZER

This application is a continuation-in-part of Application Ser. No. 397,637 filed Sept. 17, 1973, now U.S. Pat. No. 3,965,007 and Application Ser. No. 586,186 filed June 12, 1975.

BACKGROUND OF THE INVENTION

This invention relates to an ultraviolet sterilizer for use with aquarium filters.

In many aquariums, fluorescent tubes used as a source of ultraviolet light sterilize the water as it recirculates in the aquarium filter system. These fluorescent tubes are placed adjacent the stream of flow of the water and employ powers of 8 to 15 watts irradiating the solid mass of the stream of water. Further, the sterilizing action takes place without there also occurring an elimination of noxious odors produced in the aquarium.

An object of this invention is to provide an improved ultraviolet sterilizer for recirculating water flow systems in aquariums.

Another object of this invention is to provide an improved ultraviolet sterilizer requiring less power to accomplish the same sterilizing action as previously encountered.

Yet another object of this invention is to provide such an ultraviolet sterilizer in which an ozone layer is created to further cleanse the recirculating air-water mixture.

Another object of this invention is to provide such a sterilizer which is easily adaptable for use with conventional and pre-existing aquarium equipment, being of minimal cost, good durability and good quality.

Another object of this invention is to provide such an ultraviolet sterilizer which is portable.

Other objects, advantages and features of this invention will become more apparent from the following description.

SUMMARY OF THE INVENTION

In accordance with the principles of this invention, the above objects are accomplished by providing for an aquarium having a recirculating water flow filter system including a diffuser, the diffuser comprising means for thinning out the stream of water into a thin sheet, emptying the thin sheet into a container, the ultraviolet sterilizer being adapted in a housing to be mounted on top of the diffuser so as to place the source of ultraviolet light in the sterilizer a small distance from the thin sheet. In this manner, the stream of water is hollowed out by the diffuser to become a thinner sheet, the thinner sheet permitting a lower intensity to be utilized for the ultraviolet power, while accomplishing the same if not improved results as compared with the prior art devices. Further, provision of a small air gap between the sheet and the source of ultraviolet light permits an ozone area to be generated which further cleanses the recirculating air-water mixture to remove noxious odors.

It has been found that the prior art employs fluorescent tubes of 8 to 15 watts, while the present invention can accomplish the same results with only 4 watts of power and also further provide the generation of an ozone region.

BRIEF DESCRIPTION OF THE DRAWINGS

FIG. 1 is an elevational view of a portion of a water-recirculating filter system for use in an aquarium with the ultraviolet sterilizer attached thereto; and FIG. 2 is an exploded sectional view similar to FIG. 1, illustrating the ultra-violet sterilizer in greater detail.

DETAILED DESCRIPTION

Referring to the drawings, and in particular to FIG. 1, there is shown an air lift tube 10 having an inner concentric air-carrying tube 12 terminating in an air stone 14, the air stone allowing pressurized air carried in tube 12 to enter the outer water-carrying tube 10. The air stone 14 produces numerous small bubbles and as the total surface area of the bubbles rises, the water recirculates through the air lift tube 10 and is carried to a diffuser 16. The recirculating filter system illustrated in Patent Re 28,116 and U.S. Pat. No. 3,850,806 can be used wth the present invention in which the air lift tube 10 forms a part of the aquarium filter system. The diffuser 16 terminates in a spout 18, and the air-water mixture rises to the diffuser 16 by means of a conduit 20 connected to an elbow portion 22 of the air-lift tube assembly. The conduit 20 at its bottom edge terminates in a baffle 24 by which the air-water mixture is forced to rise through the conduit 20 entering into a container 26 formed as part of the diffuser 16.

Referring to FIG. 2, as the air-water mixture 28 rises, a thin sheet thereof is formed at the exit point of conduit 20, and the air-water sheet can pass through a carbon filter chamber 30 provided in container 26.

The diffuser 16 thins or hollows out the air-water mixture so that the sheet 28 flowing out of conduit 20 is much thinner than the general water stream irradiated by prior art ultra-violet sterilizers. In accordance with the principles of this invention, an ultra-violet sterilizer 32 is attached to the diffuser 16, the ultra-violet sterilizer including a housing 34 in which there is seated an ultra-violet source of light 36, such as a fluorescent bulb or the like. The housing 34 is adapted to conform to the configuration of container 26 so that a friction fit is obtained when the distal end 38 of the housing is fit on to the container 26 and is held there by friction. The ultra-violet source of light 36, when the housing 34 is placed on the container 26, is slightly removed from the sheet so as to enable the formation of an ozone region to take place. The ozone oxidizes noxious odors in the air-water sheet and contributes to the over-all sterilization and cleansing of the recirculating water.

It will thus be seen that the objects set forth above, among those made apparent from the preceding description, are efficiently attained and, since certain changes may be made in the above apparatus without departing from the scope of this invention, it is intended that all matter contained in the above description and shown in the accompanying drawings shall be interpreted as illustrative and not in a limiting sense.

We claim:

1. An aquarium comprising a recirculating water flow filter system including an air stone for mixing air with the recirculating water, a diffuser connected in said recirculating water flow system, said diffuser comprising a container, baffle and conduit means for carrying the air-water mixture from said recirculating water flow system to said container and thereby thinning the flow sheet of said air-water mixture passing from said conduit means to said container, an ultraviolet sterilizer comprising a source of ultraviolet light, a housing for holding said source of ultraviolet light and means for attaching said housing to said diffuser and locating said source of ultraviolet light proximate to said sheet of air-water mixture flowing out of said conduit means for irradiating said thinned out air-water mixture.

2. The aquarium as set forth in claim 1, wherein said housing comprises a light shield and reflector within which said ultraviolet light is seated, said light shield and reflector comprising said housing means 3. The aquarium as set forth in claim 2 wherein said housing shield and reflector has a shape conforming with the shape of said container, whereby said housing frictionally fits on top of said container.

4. In the aquarium as set forth in claim 3, wherein said light source is seated within said light shield and reflector such that said light source is separated from said sheet by an air gap such that ozone is produced to oxidize noxious odors in said air-water mixture.

5. The aquarium as set forth in claim 4, wherein said source of ultraviolet light is a fluorescent tube having a power of four watts.

6. In an aquarium ultraviolet sterilizer comprising an ultraviolet light for use with an air driven recirculating filter system, said sterilizer comprising conduit means for carrying the air-water mixture being recirculated, thinning means placed in the path of flow of said air-water mixture for thinning said mixture, and housing means for locating said ultraviolet light proximate to said thinning means for irradiating said air-water mixture and for generating ozone to oxidize said mixture.

* * * * *